(12) United States Patent
Yamaguchi (10) Patent No.: US 8,411,789 B2
(45) Date of Patent: Apr. 2, 2013

(54) RADIO COMMUNICATION APPARATUS AND METHOD

(75) Inventor: Tomohiro Yamaguchi, Kanagawa-ken (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 317 days.

(21) Appl. No.: 12/926,835

(22) Filed: Dec. 13, 2010

(65) Prior Publication Data

US 2011/0150158 A1    Jun. 23, 2011

(30) Foreign Application Priority Data

Dec. 17, 2009    (JP) .................................. 2009-286509

(51) Int. Cl.
*H04L 27/00*    (2006.01)
*H04L 7/00*    (2006.01)

(52) U.S. Cl. ........................................ 375/295; 375/355

(58) Field of Classification Search .................. 375/219, 375/354, 355, 359; 370/503, 516
See application file for complete search history.

(56) References Cited

U.S. PATENT DOCUMENTS

| | | | | |
|---|---|---|---|---|
| 6,058,101 A * | 5/2000 | Huang et al. | .................. | 370/208 |
| 7,039,825 B2 * | 5/2006 | Furukawa et al. | ............ | 713/600 |
| 7,480,359 B2 | 1/2009 | Takamatsu | | |
| 7,890,788 B2 * | 2/2011 | Yin et al. | ....................... | 713/500 |
| 2003/0118081 A1 * | 6/2003 | Philips et al. | ................. | 375/130 |

FOREIGN PATENT DOCUMENTS

| | | |
|---|---|---|
| JP | 2006-074089 | 3/2006 |
| JP | 2008-160181 | 7/2008 |

* cited by examiner

*Primary Examiner* — Khanh C Tran
(74) *Attorney, Agent, or Firm* — Louis Woo (57) ABSTRACT

A radio communication apparatus includes a clock reproducer unit which repetitively detects a symbol timing from a Nyquist point in detection-result data. A symbol generator unit controllably generates or non-generates a to-be-transmitted symbol or symbols at every symbol timing detected by the clock reproducer unit, converts the to-be-transmitted symbol or symbols into modulating data pieces, and outputs the modulating data pieces to a FIFO buffer. A D/A converter reads out modulating data pieces from the FIFO buffer at a predetermined rate and converts the read-out modulating data pieces into an analog modulating signal for use in modulation of a carrier. A controller unit controls a number of the to-be-transmitted symbol or symbols generated by the symbol generator unit at every symbol timing to hold a number of modulating data pieces in the FIFO buffer in a predetermined range.

15 Claims, 6 Drawing Sheets

FIG. 1

FIG. 2(a) SYMBOL CLOCK

FIG. 2(b) DEM DATA BUFFER

FIG. 2(c) MIC DATA BUFFER

FIG. 2(d) SP DATA BUFFER

FIG. 2(e) MOD DATA BUFFER

RADIO COMMUNICATION APPARATUS AND METHOD

BACKGROUND OF THE INVENTION

1. Field of the Invention

This invention relates to a radio communication apparatus and a radio communication method in which a symbol to be transmitted is generated at every timing for the detection of a received symbol.

2. Description of the Related Art

In a known radio communication apparatus using digital modulation and demodulation, a DSP (digital signal processor) detects every received symbol, and a timer logic outside of the DSP generates a symbol clock signal having a frequency equal to a symbol reception rate and feeds the generated symbol clock signal to the DSP as an external interrupt signal. The DSP repetitively sets a symbol timing in response to the external interrupt signal. At the symbol timing, the DSP derives the value of a received symbol from detection-result data generated through detection and analog-to-digital conversion of a received analog signal. The DSP detects, from the detection-result data, timing-error information indicating a difference of the symbol timing from the Nyquist point. The DSP notifies the external timer logic of the timing-error information. The external timer logic temporally adjusts the external interrupt signal in response to the timing-error information so that the symbol timing set by the DSP will be controlled to reduce the difference of the symbol timing from the Nyquist point. Therefore, the symbol timing is adaptively controlled to follow the Nyquist point or coincide therewith. Even in the event that the symbol reception rate changes, the controlled symbol timing enables the correct value of a received symbol to be derived. Such a known radio communication apparatus is disclosed in, for example, Japanese patent application publication number 2008-160181.

In the known radio communication apparatus, an external-signal-responsive interrupt for setting a symbol timing repetitively occurs in the DSP at a rate equal to the symbol reception rate. In a hypothetical case, every symbol to be transmitted is generated at a timing defined by the symbol timing responsive to the external interrupt signal while the known radio communication apparatus performs transmission. In such a hypothetical case, a proper symbol transmission rate is available.

It is assumed that such a known radio communication apparatus is used for a radio-communication base station designed to simultaneously perform reception and transmission to implement, for example, a relay action or a repeater action. In this assumed case, the following problem may occur.

As the symbol reception rate changes, the symbol timing responsive to the external interrupt signal varies so that the symbol transmission rate varies also. In general, the symbol transmission rate about a signal transmitted from a base station is used as a reference for operation of terminal devices communicating with the base station. Accordingly, the symbol transmission rate is required to be highly accurate and stable. A variation in the symbol transmission rate is undesirable. When the symbol timing is fixed to hold the symbol transmission rate constant, the symbol timing can not follow a change in the symbol reception rate so that an error may occur in the derived value of a received symbol. Such an error means a reduction of the receiving performances of the radio communication apparatus. To solve this problem, it is conceivable to provide external timer logics for reception and transmission respectively. As compared to the presence of only one external timer logic, two external timer logics increase the apparatus cost and the consumed electric power and occupy two interrupt ports of the DSP.

SUMMARY OF THE INVENTION

It is a first object of this invention to provide a radio communication apparatus in which every symbol to be transmitted is generated at a timing based on a timing for every received symbol, and which can hold a symbol transmission rate constant.

It is a second object of this invention to provide a radio communication method in which every symbol to be transmitted is generated at a timing based on a timing for every received symbol, and which can hold a symbol transmission rate constant.

A first aspect of this invention provides a radio communication apparatus comprising a clock reproducer unit configured to repetitively detect a symbol timing from a Nyquist point in detection-result data; a first FIFO buffer; a symbol generator unit configured to controllably generate or non-generate a to-be-transmitted symbol or symbols at every symbol timing detected by the clock reproducer unit, convert the to-be-transmitted symbol or symbols into modulating data pieces, and output the modulating data pieces to the first FIFO buffer; a first D/A converter configured to read out modulating data pieces from the first FIFO buffer at a predetermined rate and convert the read-out modulating data pieces into an analog modulating signal for use in modulation of a carrier; and a controller unit configured to control a number of the to-be-transmitted symbol or symbols generated by the symbol generator unit at every symbol timing to hold a number of modulating data pieces in the first FIFO buffer in a predetermined range.

A second aspect of this invention is based on the first aspect thereof, and provides a radio communication apparatus further comprising a second FIFO buffer; a first A/D converter configured to repetitively sample an analog to-be-transmitted signal at a predetermined sampling rate to generate analog signal samples, convert the generated analog, signal samples into to-be-transmitted data pieces, and output the to-be-transmitted data pieces to the second FIFO buffer; and an encoder unit configured to read out, from the second FIFO buffer, to-be-transmitted data pieces whose number corresponds to the number of the to-be-transmitted symbol or symbols generated by the symbol generator at every symbol timing, and encode the read-out to-be-transmitted data pieces into encoding-result data; wherein the symbol generator unit operates to generate the to-be-transmitted symbol or symbols on the basis of the encoding-result data generated by the encoder unit, and the control of the number of the to-be-transmitted symbol or symbols by the controller unit causes a number of to-be-transmitted data pieces in the second FIFO buffer to be held in a predetermined range.

A third aspect of this invention is based on the second aspect thereof, and provides a radio communication apparatus further comprising a third FIFO buffer; a second A/D converter configured to repetitively sample an analog detection-result signal at a predetermined sampling rate to generate analog signal samples, convert the generated analog signal samples into detection-result data pieces, and output the detection-result data pieces to the third FIFO buffer; a symbol detector unit configured to read out detection-result data pieces from the third FIFO buffer and detect a received symbol from the read-out detection-result data pieces; a fourth FIFO buffer; a decoder unit configured to decode the received symbol detected by the symbol detector unit into decoding-result data pieces and output the decoding-result data pieces to the fourth FIFO buffer; and a second D/A converter configured to read out the decoding-result data pieces from the fourth FIFO buffer at a predetermined rate and convert the read-out decoding-result data pieces into a corresponding analog signal; wherein the controller unit operates to control a number of decoding-result data pieces generated by the decoder unit and outputted to the fourth FIFO buffer for one symbol to hold a number of decoding-result data pieces in the fourth FIFO buffer in a predetermined range.

A fourth aspect of this invention is based on the third aspect thereof, and provides a radio communication apparatus wherein the controller unit operates to control the encoder unit to perform encoding for two symbols at one symbol timing to hold the number of to-be-transmitted data pieces in the second FIFO buffer in the predetermined range in cases where the number of to-be-transmitted data pieces in the second FIFO buffer reaches an upper limit of the predetermined range due to a retard of the symbol timing from a prescribed timing, and the controller unit operates to control the symbol generator unit to generate modulating data pieces for plural symbols at one symbol timing to hold the number of modulating data pieces in the first FIFO buffer in the predetermined range in cases where the number of modulating data pieces in the first FIFO buffer reaches a lower limit of the predetermined range due to the retard of the symbol timing from the prescribed timing.

A fifth aspect of this invention is based on the third aspect thereof, and provides a radio communication apparatus wherein the controller unit operates to control the encoder unit to suspend encoding at one symbol timing or more to hold the number of to-be-transmitted data pieces in the second FIFO buffer in the predetermined range in cases where the number of to-be-transmitted data pieces in the second FIFO buffer reaches a lower limit of the predetermined range due to an advance of the symbol timing from a prescribed timing, and the controller unit operates to control the symbol generator unit to suspend generating modulating data pieces at one symbol timing or more to hold the number of modulating data pieces in the first FIFO buffer in the predetermined range in cases where the number of modulating data pieces in the first FIFO buffer reaches an upper limit of the predetermined range due to the advance of the symbol timing from the prescribed timing.

A sixth aspect of this invention provides a method for radio communication. The method comprises the steps of detecting a symbol timing from a Nyquist point in detection-result data; controllably generating or non-generating a to-be-transmitted symbol or symbols at every detected symbol timing, converting the to-be-transmitted symbol or symbols into modulating data pieces, and outputting the modulating data pieces to a first FIFO buffer; reading out modulating data pieces from the first FIFO buffer at a predetermined rate and converting the read-out modulating data pieces into an analog modulating signal for use in modulation of a carrier; and controlling a number of the to-be-transmitted symbol or symbols generated at every detected symbol timing to hold a number of modulating data pieces in the first FIFO buffer in a predetermined range.

A seventh aspect this invention is based on the sixth aspect thereof, and provides a method further comprising the steps of repetitively sampling an analog to-be-transmitted signal at a predetermined sampling rate to generate analog signal samples, converting the generated analog signal samples into to-be-transmitted data pieces, and outputting the to-be-transmitted data pieces to a second FIFO buffer; and reading out, from the second FIFO buffer, to-be-transmitted data pieces whose number corresponds to the number of the to-be-transmitted symbol or symbols generated at every symbol timing, and encoding the read-out to-be-transmitted data pieces into encoding-result data; wherein the to-be-transmitted symbol or symbols are generated on the basis of the encoding-result data, and the control of the number of the to-be-transmitted symbol or symbols causes a number of to-be-transmitted data pieces in the second FIFO buffer to be held in a predetermined range.

An eighth aspect of this invention is based on the seventh aspect thereof, and provides a method further comprising the steps of repetitively sampling an analog detection-result signal at a predetermined sampling rate to generate analog signal samples, converting the generated analog signal samples into detection-result data pieces, and outputting the detection-result data pieces to a third FIFO buffer; reading out detection-result data pieces from the third FIFO buffer and detecting a received symbol from the read-out detection-result data pieces; decoding the detected symbol into decoding-result data pieces and outputting the decoding-result data pieces to a fourth FIFO buffer; and reading out decoding-result data pieces from the fourth FIFO buffer at a predetermined rate and converting the read-out decoding-result data pieces into a corresponding analog signal; wherein a number of decoding-result data pieces generated and outputted to the fourth FIFO buffer for one symbol is controlled to hold a number of decoding-result data pieces in the fourth FIFO buffer in a predetermined range.

A ninth aspect of this invention is based on the eighth aspect thereof, and provides a method wherein encoding for two symbols is performed at one symbol timing to hold the number of to-be-transmitted data pieces in the second FIFO buffer in the predetermined range in cases where the number of to-be-transmitted data pieces in the second FIFO buffer reaches an upper limit of the predetermined range due to a retard of the symbol timing from a prescribed timing, and modulating data pieces for plural symbols are generated at one symbol timing to hold the number of modulating data pieces in the first FIFO buffer in the predetermined range in cases where the number of modulating data pieces in the first FIFO buffer reaches a lower limit of the predetermined range due to the retard of the symbol timing from the prescribed timing.

A tenth aspect of this invention is based on the eighth aspect thereof, and provides a method wherein encoding is suspended at one symbol timing or more to hold the number of to-be-transmitted data pieces in the second FIFO buffer in the predetermined range in cases where the number of to-be-transmitted data pieces in the second FIFO buffer reaches a lower limit of the predetermined range due to an advance of the symbol timing from a prescribed timing, and generating modulating data pieces is suspended at one symbol timing or more to hold the number of modulating data pieces in the first FIFO buffer in the predetermined range in cases where the number of modulating data pieces in the first FIFO buffer reaches an upper limit of the predetermined range due to the advance of the symbol timing from the prescribed timing.

An eleventh aspect of this invention provides a radio communication apparatus comprising means for repetitively detecting a symbol timing from a Nyquist point in detection-result data; a first FIFO buffer; means for controllably generating or non-generating a to-be-transmitted symbol or symbols at every detected symbol timing, converting the to-be-transmitted symbol or symbols into modulating data pieces, and writing the modulating data pieces into the first FIFO buffer; means for reading out modulating data pieces from the first FIFO buffer at a predetermined rate and converting the read-out modulating data pieces into an analog modulating signal for use in modulation of a carrier; and means for controlling a number of the to-be-transmitted symbol or symbols generated at every symbol timing to hold a number of modulating data pieces in the first FIFO buffer in a predetermined range.

A twelfth aspect of this invention is base on the eleventh aspect thereof, and provides a radio communication apparatus further comprising: a second FIFO buffer; means for repetitively sampling an analog to-be-transmitted signal at a predetermined sampling rate to generate analog signal samples, converting the generated analog signal samples into to-be-transmitted data pieces, and writing the to-be-transmitted data pieces into the second FIFO buffer; and means for reading out, from the second FIFO buffer, to-be-transmitted data pieces whose number corresponds to the number of the to-be-transmitted symbol or symbols generated at every symbol timing, and encoding the read-out to-be-transmitted data pieces into encoding-result data; wherein the generating means comprises means for generating the to-be-transmitted symbol or symbols on the basis of the encoding-result data, and the control of the number of the to-be-transmitted symbol or symbols by the controlling means causes a number of to-be-transmitted data pieces in the second FIFO buffer to be held in a predetermined range.

A thirteenth aspect of this invention is based on the twelfth aspect thereof, and provides a radio communication apparatus further comprising a third FIFO buffer; means for repetitively sampling an analog detection-result signal at a predetermined sampling rate to generate analog signal samples, converting the generated analog signal samples into detection-result data pieces, and writing the detection-result data pieces to the third FIFO buffer; means for reading out detection-result data pieces from the third FIFO buffer and detecting a received symbol from the read-out detection-result data pieces; a fourth FIFO buffer; means for decoding the detected symbol into decoding-result data pieces and outputting the decoding-result data pieces to the fourth FIFO buffer; and means for reading out decoding-result data pieces from the fourth FIFO buffer at a predetermined rate and converting the read-out decoding-result data pieces into a corresponding analog signal; wherein the controlling means comprises means for controlling a number of decoding-result data pieces generated and written into the fourth FIFO buffer for one symbol to hold a number of decoding-result data pieces in the fourth FIFO buffer in a predetermined range.

A fourteenth aspect of this invention is based on the thirteenth aspect thereof, and provides a radio communication apparatus wherein the controlling means comprises means for controlling the encoding means to perform encoding for two symbols at one symbol timing to hold the number of to-be-transmitted data pieces in the second FIFO buffer in the predetermined range in cases where the number of to-be-transmitted data pieces in the second FIFO buffer reaches an upper limit of the predetermined range due to a retard of the symbol timing from a prescribed timing, and the controlling means comprises means for controlling the generating means to generate modulating data pieces for plural symbols at one symbol timing to hold the number of modulating data pieces in the first FIFO buffer in the predetermined range in cases where the number of modulating data pieces in the first FIFO buffer reaches a lower limit of the predetermined range due to the retard of the symbol timing from the prescribed timing.

A fifteenth aspect of this invention is based on the thirteenth aspect thereof, and provides a radio communication apparatus wherein the controlling means comprises means for controlling the encoder means to suspend encoding at one symbol timing or more to hold the number of to-be-transmitted data pieces in the second FIFO buffer in the predetermined range in cases where the number of to-be-transmitted data pieces in the second FIFO buffer reaches a lower limit of the predetermined range due to an advance of the symbol timing from a prescribed timing, and the controlling means comprises means for controlling the generating means to suspend generating modulating data pieces at one symbol timing or more to hold the number of modulating data pieces in the first FIFO buffer in the predetermined range in cases where the number of modulating data pieces in the first FIFO buffer reaches an upper limit of the predetermined range due to the advance of the symbol timing from the prescribed timing.

DETAILED DESCRIPTION OF THE INVENTION

Figure 1:
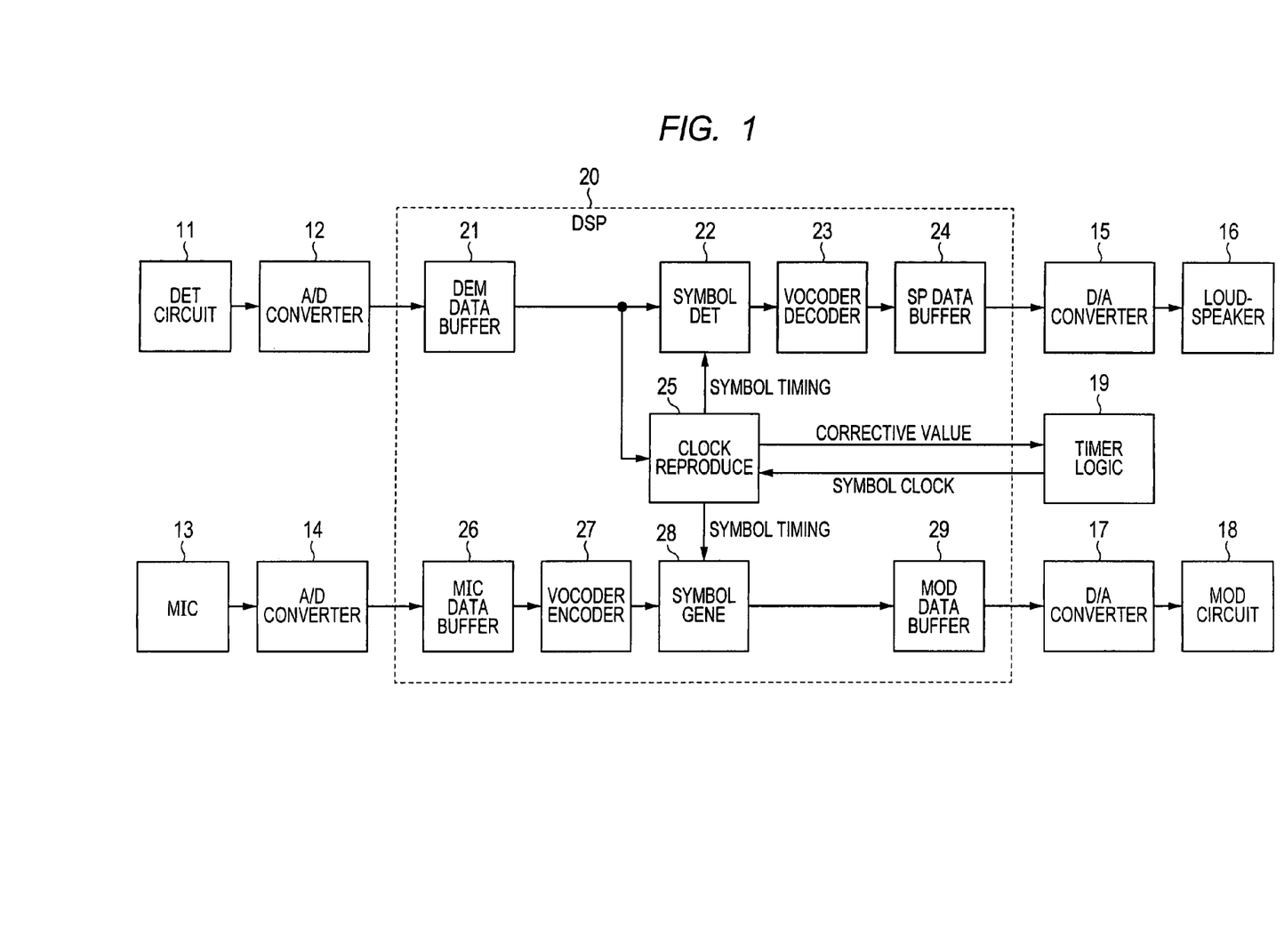
FIG. 1 is a block diagram of a radio communication apparatus according to an embodiment of this invention.
Figure 2A:
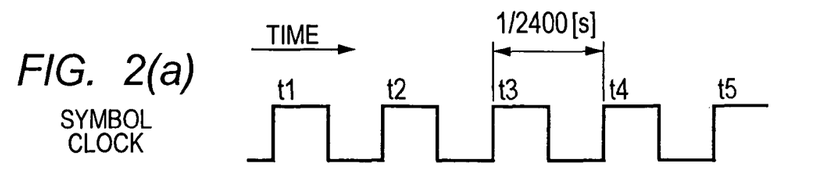
FIGS. 2(a) to 2(e) are a time-domain diagram showing the waveform of a symbol clock signal and the states of data buffers in the apparatus of FIG. 1 which occur in normal conditions where a symbol reception rate is equal to a prescribed rate.
Figure 2B:
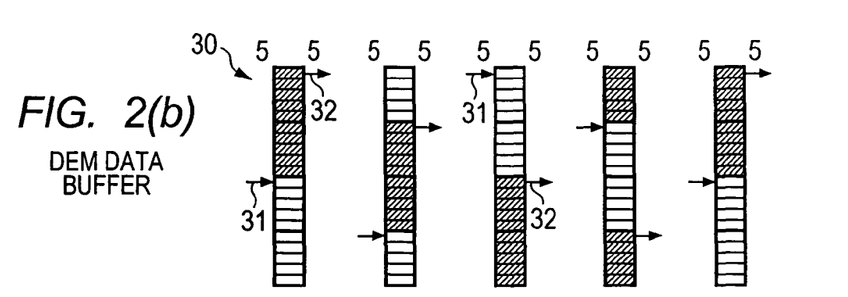
Figure 2C:
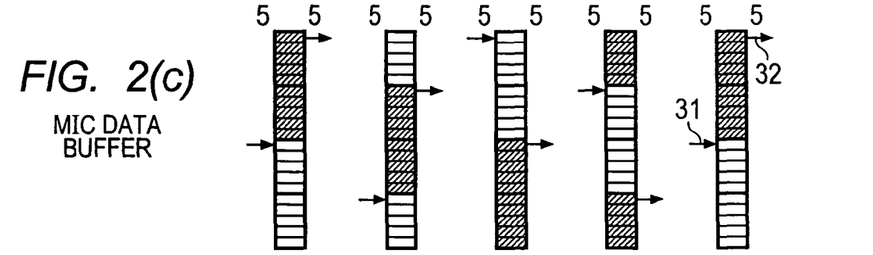
Figure 2D:
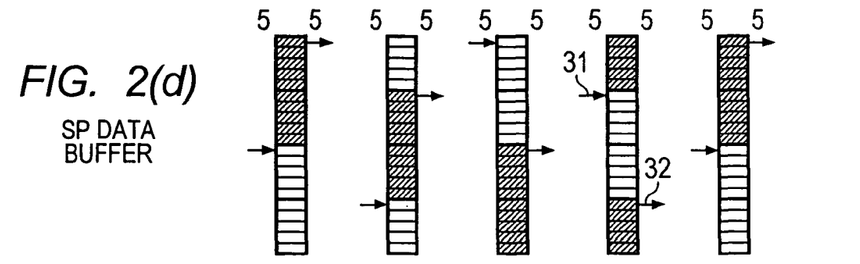
Figure 2E:
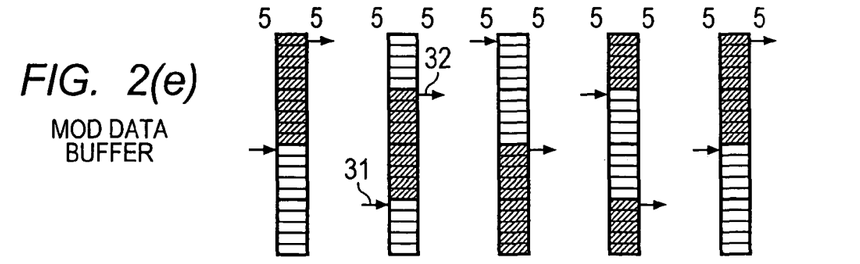

FIG. 1 shows a radio communication apparatus according to an embodiment of this invention. The radio communication apparatus of FIG. 1 can simultaneously implement reception and transmission (receiving operation and transmitting operation). As shown in FIG. 1, the radio communication apparatus includes a detection circuit (demodulation circuit) 11, an analog-to-digital (A/D) converter 12, a microphone 13, an A/D converter 14, a digital-to-analog (D/A) converter 15, a loudspeaker 16, a D/A converter 17, a modulation circuit 18, a timer logic 19, and a digital signal processor (DSP) 20.

The detection circuit 11 subjects a received signal to detection or demodulation to generate an analog detection-result signal (baseband signal). The detection circuit 11 feeds the analog detection-result signal to the A/D converter 12. The A/D converter 12 changes the analog detection-result signal into corresponding digital detection-result data. The A/D converter 12 feeds the detection-result data to the DSP 20.

The microphone 13 converts user's utterance into an analog audio signal. The microphone 13 feeds the analog audio signal to the A/D converter 14. The A/D converter 14 changes the analog audio signal into a corresponding digital audio signal. The A/D converter 14 feeds the digital audio signal to the DSP 20.

The DSP 20 feeds a digital audio signal to the D/A converter 15. The D/A converter 15 changes the digital audio signal into a corresponding analog audio signal. The D/A converter 15 feeds the analog audio signal to the loudspeaker 16. The loudspeaker 16 converts the analog audio signal into corresponding sound or voice.

The DSP 20 feeds a digital modulating signal to the D/A converter 17. The D/A converter 17 changes the digital modulating signal into a corresponding analog modulating signal (baseband signal). The D/A converter 17 feeds the analog modulating signal to the modulation circuit 18. The modulation circuit 18 modulates a carrier in accordance with the analog modulating signal to generate a modulation-result signal. The modulation circuit 18 feeds the modulation-result signal to a next stage (not shown).

The timer logic 19 feeds a symbol clock signal to the DSP 20. The timer logic 19 receives a control signal from the DSP 20.

The DSP 20 forms a controller unit. The DSP 20 includes a combination of an input/output port, a processing section, and memories. The DSP 20 operates in accordance with a control program (computer program) stored in, for example, one of the memories. The control program enables the DSP 20 to operate as various devices 21-29 mentioned hereafter. The control program has a main routine and a subroutine or subroutines.

The computer program in the DSP 20 implements a FIFO data buffer (referred to as a DEM data buffer hereafter) 21, a symbol detector 22, a vocoder detector 23, a FIFO data buffer (referred to as an SP data buffer hereafter) 24, a clock reproducer 25, a FIFO data buffer (referred to as a MIC data buffer hereafter) 26, a vocoder encoder 27, a symbol generator 28, and a FIFO data buffer (referred to as a MOD data buffer hereafter) 29.

It should be noted that FIG. 1 substantially shows the flow of operation of the DSP 20 rather than the hardware structure thereof.

The DEM data buffer 21 temporarily stores the detection-result data from the A/D converter 12 before passing it to the symbol detector 22 and the clock reproducer 25. The symbol detector 22 detects the value of every symbol represented by the detection-result data. The symbol detector 22 notifies the vocoder decoder 23 of every detected symbol value. The vocoder decoder 23 decodes every detected symbol value into a prescribed number of successive digital-audio-signal samples (pieces). The vocoder decoder 23 sequentially outputs and writes the digital-audio-signal samples to and in the SP data buffer 24. The SP data buffer 24 temporarily stores every digital-audio-signal sample before passing it to the D/A converter 15. The SP data buffer 24 outputs a sequence of digital-audio-signal samples (pieces), that is, a digital audio signal, to the D/A converter 15.

The clock reproducer 25 repetitively generates, in response to the detection-result data from the DEM data buffer 21, a corrective value for correcting a symbol timing. The clock reproducer 25 notifies the timer logic 19 of the corrective value. The clock reproducer 25 repetitively reproduces a symbol timing on the basis of the symbol clock signal from the timer logic 19. The clock reproducer 25 notifies the symbol detector 22 of the reproduced symbol timing. The symbol detector 22 implements the detection of every symbol value at the reproduced symbol timing. In addition, the clock reproducer 25 notifies the symbol generator 28 of the reproduced symbol timing.

The MIC data buffer 26 temporarily stores the digital audio signal from the A/D converter 14 before passing it to the vocoder encoder 27. The vocoder encoder 27 encodes the digital audio signal into encoded digital audio data (digital audio data of a prescribed code). The vocoder encoder 27 feeds the encoded digital audio data to the symbol generator 28. At every reproduced symbol timing notified by the clock reproducer 25, the symbol generator 28 generates a to-be-transmitted symbol based on the encoded digital audio data, and converts the to-be-transmitted symbol into a prescribed number of digital modulating signal samples (pieces). The symbol generator 28 sequentially outputs and writes the digital modulating signal samples to and in the MOD data buffer 29. The MOD data buffer 29 temporarily stores every digital modulating signal sample before passing it to the D/A converter 17. The MOD data buffer 29 outputs a sequence of digital modulating signal samples (pieces), that is, a digital modulating signal, to the D/A converter 17.

The radio communication apparatus implements radio communications of a digital modulation/demodulation system with other apparatuses.

In receiving operation of the radio communication apparatus, the detection circuit 11 subjects a received signal to detection (demodulation) to generate an analog detection-result signal. The detection circuit 11 feeds the analog detection-result signal to the A/D converter 12. The A/D converter 12 repetitively samples the analog detection-result signal at a predetermined constant rate equal to a prescribed symbol rate multiplied by a given number or integer "A". The A/D converter 12 changes every resultant analog signal sample into a corresponding digital signal sample (piece). The A/D converter 12 sequentially outputs and writes digital signal samples (detection-result data pieces) to and in the DEM data buffer 21 in the DSP 20. The DEM data buffer 21 temporarily stores the detection-result data pieces (the digital signal samples). The DSP 20 derives every received symbol from the detection-result data pieces in the DEM data buffer 21. The symbol clock signal fed from the timer logic 19 to the clock reproducer 25 in the DSP 20 is used as an interrupt signal. The clock reproducer 25 repetitively reproduces a symbol timing in response to the interrupt signal. The clock reproducer 25 notifies the symbol detector 22 of the reproduced symbol timing. At every reproduced symbol timing, the symbol detector 22 fetches or reads out "A" successive digital signal samples (pieces) from the DEM data buffer 21 and decides the value of a received symbol on the basis of the "A" successive digital signal samples.

Normally, the Nyquist point exists in a time range occupied by the central one among the "A" successive digital signal samples, and the Nyquist point and the reproduced symbol timing coincide. A change in the symbol reception rate may cause the reproduced symbol timing to move out of coincidence with the Nyquist point so that the Nyquist point will exist in a time range occupied by a digital signal sample different from the central one among the "A" successive digital signal samples. In such a case, the clock reproducer 25 detects, from the detection-result data pieces, a corrective value related to the difference of the reproduced symbol timing from the Nyquist point. The clock reproducer 25 sends a signal representative of the corrective value to the timer logic 19. The timer logic 19 temporally adjusts the symbol clock signal in response to the corrective value so that the interval between interruptions responsive to the symbol clock signal will be controlled to reduce the difference of the reproduced symbol timing from the Nyquist point.

Specifically, the clock reproducer 25 derives the Nyquist point from the digital signal samples of the detection-result signal, and compares the derived Nyquist point with the reproduced symbol timing to detect the difference of the reproduced symbol timing from the derived Nyquist point. Deriving the Nyquist point from the digital signal samples of the detection-result signal may use, for example, a corresponding method shown in U.S. Pat. No. 7,480,359 (parallel to Japanese patent application publication number 2006-74089), the disclosure of which is hereby incorporated by reference. In the case where the timer logic 19 outputs one symbol clock pulse to the clock reproducer 25 each time the number counted by an internal counter reaches a value "N", the corrective value related to the difference of the reproduced symbol timing from the Nyquist point is designed for correction of the value "N". These actions of the timer logic 19 and the clock reproducer 25 may use, for example, corresponding actions shown in Japanese patent application publication number 2008-160181, the disclosure of which is hereby incorporated by reference.

The symbol detector 22 notifies the vocoder decoder 23 of the decided symbol value. The vocoder decoder 23 decodes every detected symbol value into a prescribed number "B" of successive digital-audio-signal samples (pieces). Thus, at every symbol timing, one symbol value is converted into "B" successive digital-audio-signal samples. The vocoder decoder 23 sequentially feeds and writes the digital-audio-signal samples to and in the SP data buffer 24. The SP data buffer 24 temporarily stores every digital-audio-signal sample. The D/A converter 15 sequentially fetches or reads digital-audio-signal samples from the SP data buffer 24 at a predetermined constant rate, and converts every digital-audio-signal sample into a corresponding analog-audio-signal sample. The D/A converter 25 generates successive analog-audio-signal samples forming an analog audio signal. The D/A converter 25 feeds the analog audio signal to the loudspeaker 16. The loudspeaker 16 converts the analog audio signal into corresponding sound.

In transmitting operation of the radio communication apparatus, the microphone 13 converts user's utterance into an analog audio signal. The microphone 13 feeds the analog audio signal to the A/D converter 14. The A/D converter 14 repetitively samples the analog audio signal at a predetermined constant rate equal to an integer multiple of the prescribed symbol rate. The A/D converter 14 changes every resultant analog signal sample into a corresponding digital signal sample (piece). The A/D converter 14 sequentially outputs and writes digital signal samples (digital audio data pieces) to and in the MIC data buffer 26 in the DSP 20. For every symbol timing, the MIC data buffer 26 receives and stores a prescribed number "C" of successive digital signal samples (pieces). At every symbol timing, the vocoder encoder 27 fetches or reads out "C" successive digital signal samples from the MIC data buffer 26, and encodes them into a corresponding code word (a corresponding word of the prescribed code). The vocoder encoder 27 feeds the code word to the symbol generator 28. At every reproduced symbol timing notified by the clock reproducer 25, the symbol generator 28 converts a code word into a to-be-transmitted symbol, and further converts the to-be-transmitted symbol into a prescribed number "D" of successive digital modulating signal samples (pieces). The symbol generator 28 sequentially outputs and writes the digital modulating signal samples to and in the MOD data buffer 29. For every reproduced symbol timing, the MOD data buffer 29 receives and stores "D" successive digital modulating signal samples (pieces). The D/A converter 17 sequentially fetches or reads out digital modulating signal samples from the MOD data buffer 29 at a predetermined constant rate, and converts every digital modulating signal sample into a corresponding analog modulating signal sample. The D/A converter 17 generates successive analog modulating signal samples forming an analog modulating signal. The D/A converter 17 feeds the analog modulating signal to the modulation circuit 18. The modulation circuit 18 modulates a carrier in accordance with the analog modulating signal to generate a modulation-result signal. The modulation circuit 18 feeds the modulation-result signal to a next stage (not shown). The modulation-result signal is transmitted from the radio communication apparatus as a radio wave.

As previously mentioned, for every symbol timing in the receiving operation of the radio communication apparatus, "A" digital signal samples are inputted into the DEM data buffer 21 and "A" digital signal samples are outputted therefrom while "B" digital signal samples are inputted into the SP data buffer 24 and "B" digital signal samples are outputted therefrom. For every symbol timing in the transmitting operation of the radio communication apparatus, "C" digital signal samples are inputted into the MIC data buffer 26 and "C" digital signal samples are outputted therefrom while "D" digital signal samples are inputted into the MOD data buffer 29 and "D" digital signal samples are outputted therefrom. The frequency of the sampling by the A/D converter 12 is equal to the prescribed symbol rate multiplied by the number "A". The frequency of the sampling by the D/A converter 15 is equal to the prescribed symbol rate multiplied by the number "B". The frequency of the sampling by the A/D converter 14 is equal to the prescribed symbol rate multiplied by the number "C". The frequency of the sampling by the D/A converter 17 is equal to the prescribed symbol rate multiplied by the number "D". Preferably, the prescribed symbol rate and the numbers "A"-"D" are chosen to meet the required specifications of the radio communication apparatus. According to an example, the prescribed symbol rate is equal to 2400 sps (symbols per second) while each of the numbers "A"-"D" is equal to 5. In this case, the frequency of the sampling by each of the A/D converters 12 and 14 and the D/A converters 15 and 17 is equal to 12 kHz.

Preferably, each of the DEM data buffer 21, the SP data buffer 24, the MIC data buffer 26, and the MOD data buffer 29 has 20 storage locations for 20 digital signal samples respectively. Each of the data buffers 21, 24, 26, and 29 may have storage locations, the number of which differs from 20.

With reference to FIGS. 2(*a*) to 2(*e*), there are shown movements of digital signal samples in the data buffers 21, 24, 26, and 29 which occur at every symbol timing defined by the symbol clock signal corresponding to the symbol reception rate equal to 2400 sps (the prescribed symbol rate). Specifically, FIG. 2(*a*) shows the waveform of the symbol clock signal. FIGS. 2(*b*), 2(*c*), 2(*d*), and 2(*e*) show the states of the DEM data buffer 21, the MIC data buffer 26, the SP data buffer 24, and the MOD data buffer 29 respectively which occur at time points t1-t5 with respect to the symbol clock signal. The time point t1 is the oldest, and the time points t2, t3, t4, and t5 successively follow the time point t1 in that order. For example, each time the symbol clock signal changes from its low level state to its high level state, a symbol timing is generated. Then, inputting and outputting digital data samples into and from each of the data buffers 21, 24, 26, and 29 are performed for the generated symbol timing. The time points t1-t5 immediately follow the moments at which inputting and outputting digital data samples into and from the data buffers 21, 24, 26, and 29 have been performed for the related symbol timings respectively.

In FIGS. 2(*b*)-2(*e*), the reference numeral "31" denotes input pointers indicating input start positions (addresses) with respect to the data buffers 21, 24, 26, and 29. Furthermore, the reference numeral "32" denotes output pointers indicating output start positions (addresses) with respect to the data buffers 21, 24, 26, and 29. Each of the data buffers 21, 24, 26, and 29 has, for example, 20 storage locations for storing 20 digital signal samples respectively which normally correspond to 4 successive symbols. In FIGS. 2(b) to 2(e), a set of the 20 storage locations is denoted by the reference numeral "30". The 20 storage locations are assigned serial addresses respectively. In FIGS. 2(b) to 2(e), for inputting digital signal samples (pieces) into or outputting digital data samples (pieces) from each of the data buffers 21, 24, 26, and 29, the 20 storage locations are sequentially accessed in the order from the uppermost storage location to the lowermost storage location, and the access returns to the uppermost storage location after the lowermost storage location has been accessed. Under the normal conditions where the symbol reception rate is equal to 2400 sps (the prescribed symbol rate), the input pointer 31 and the output pointer 32 regarding each of the data buffers 21, 24, 26, and 29 indicate respective positions or addresses always spaced at an interval corresponding to 2 symbols. In FIGS. 2(b) to 2(e), the hatched areas denote storage locations currently holding digital signal samples. Thus, the hatched areas show digital signal samples which have been inputted into the data buffers 21, 24, 26, and 29, and which have not been outputted therefrom yet. In FIGS. 2(b) to 2(e), the two numerals "5" immediately above each group of 20 storage locations denote the number of digital signal samples inputted into the related data buffer and the number of digital signal samples outputted therefrom at the related time point.

As shown in FIGS. 2(a) to 2(e), under the normal conditions where the symbol reception rate is equal to 2400 sps (the prescribed symbol rate), for every symbol clock pulse, 5 successive digital signal samples corresponding to one symbol are inputted into each of the data buffers 21, 24, 26, and 29 while 5 successive digital signal samples corresponding to a symbol second immediately preceding the aforesaid one symbol are outputted therefrom. Therefore, regarding each of the data buffers 21, 24, 26, and 29, the positions indicated by the input pointer 31 and the output pointer 32 advance by 5 addresses for every symbol clock pulse and circulate while remaining spaced at an interval corresponding to 2 symbols.

Figure 3A:
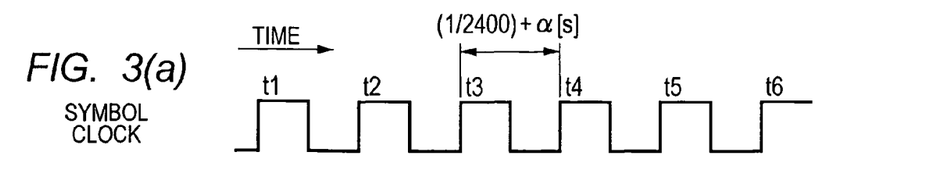
FIGS. 3(a) to 3(e) are a time-domain diagram showing the waveform of the symbol clock signal and the states of the data buffers which occur in conditions where the symbol reception rate is lower than the prescribed rate.
Figure 3B:
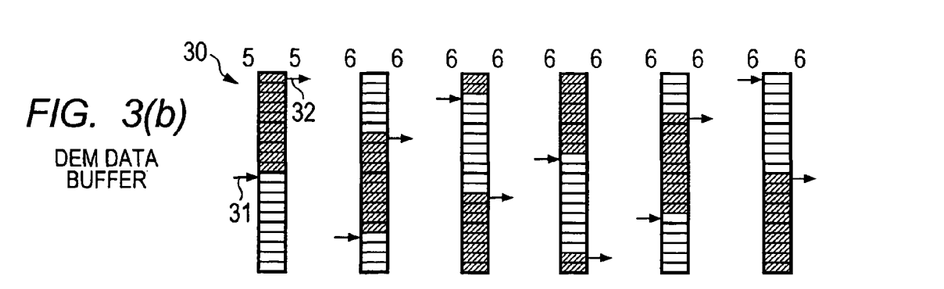

With reference to FIGS. 3(a) to 3(e), there are shown movements of digital signal samples in the data buffers 21, 24, 26, and 29 which occur at every symbol timing defined by the symbol clock signal corresponding to the symbol reception rate lower than 2400 sps (the prescribed symbol rate). As previously mentioned, when the symbol reception rate changes so that the symbol timing deviates from the Nyquist point, the clock reproducer 25 operates to shift the symbol timing in the direction of reducing the difference of the symbol timing from the Nyquist point. Thus, as the symbol reception rate decreases, the interval between adjacent symbol timings increases and hence the number of digital signal samples inputted into the DEM data buffer 21 per symbol timing increases also. It should be noted that the number of samples generated by the A/D converter 12 for a unit time remains constant. In FIG. 3(b), the number of digital signal samples inputted into the DEM data buffer 21 per symbol timing increases from 5 to 6. As previously mentioned, at every symbol timing, the symbol detector 22 fetches or reads out digital signal samples corresponding to one symbol from the DEM data buffer 21. Thus, in FIG. 3(b), the symbol detector 22 fetches or reads out 6 digital signal samples from the DEM buffer 21 per symbol timing and decides a symbol value on the basis of the 6 digital signal samples. Similarly, the number of digital signal samples inputted into the MIC data buffer 26 and the number of digital signal samples outputted from each of the SP data buffer 24 and the MOD data buffer 29 per symbol timing increase from 5 to 6. It should be noted that the number of samples generated or processed by each of the A/D converter 14 and the D/A converters 15 and 17 for a unit time remains constant.

Figure 3C:
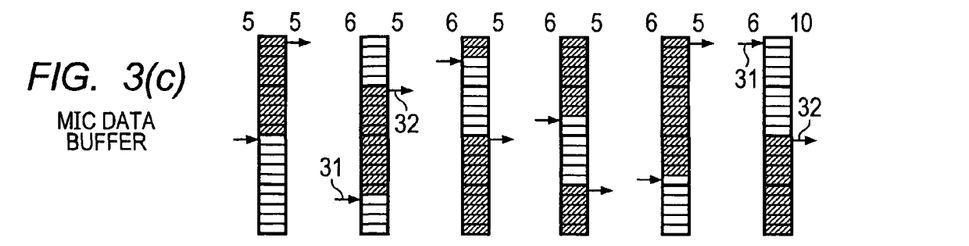
Figure 3D:
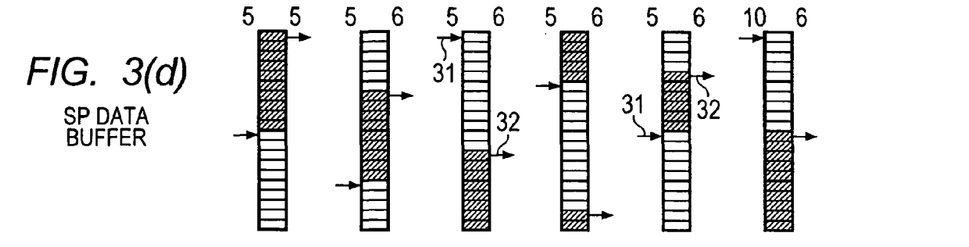
Figure 3E:
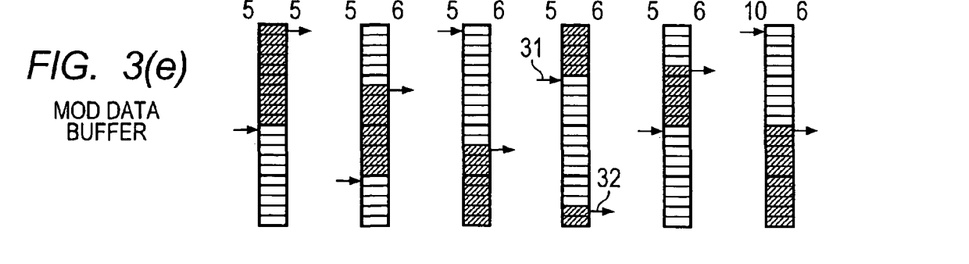

In the processing by the vocoder decoder 23, the vocoder encoder 27, and the symbol generator 28, five digital signal samples are assigned to one symbol. Therefore, the number of digital signal samples outputted from the MIC data buffer 26 and the number of digital signal samples inputted into each of the SP data buffer 24 and the MOD data buffer 29 per symbol timing substantially remain constant (5 in FIGS. 3(c), 3(d), and 3(e)). Thus, the relation between the positions indicated by the input pointer 31 and the output pointer 32 regarding each of the data buffers 24, 26, and 29 varies in accordance with the lapse of time. As shown in FIG. 3(c), regarding the MIC data buffer 26, the number of digital signal samples inputted per symbol timing is greater than the number of digital signal samples outputted per symbol timing so that the number of digital signal samples in the buffer increases and the positions indicated by the input pointer 31 and the output pointer 32 approach each other while a storage area unoccupied by digital signal samples is sandwiched therebetween. As shown in FIGS. 3(d) and 3(e), regarding each of the SP data buffer 24 and the MOD data buffer 29, the number of digital signal samples inputted per symbol timing is smaller than the number of digital signal samples outputted per symbol timing so that the number of digital signal samples in the buffer decreases and the positions indicated by the input pointer 31 and the output pointer 32 approach each other while a storage area occupied by digital signal samples is sandwiched therebetween. The DSP 20 implements the following method of avoiding the coincidence of the positions indicated by the input pointer 31 and the output pointer 32 regarding each of the SP data buffer 24, the MIC data buffer 26, and the MOD data buffer 29.

To avoid the above-mentioned coincidence regarding the SP data buffer 24, the vocoder decoder 23 temporarily generates 10 digital-audio-signal samples only at, for example, the time point t6 in FIG. 3(a). It should be noted that the vocoder decoder 23 generates 5 digital-audio-signal samples at every symbol timing under the normal conditions. Preferably, the vocoder decoder 23 uses one having the function of increasing and decreasing the number of decoding-result samples generated per unit time. By using this function, the number of digital-audio-signal samples generated at the time point t6 is increased from 5 to 10. The vocoder decoder 23 may not have this function. In this case, the number of digital-audio-signal samples generated at the time point t6 is increased by a suitable device such as a multi-rate filter or an interpolator. As a result of the increase in the generated sample number, for the time range from the time point t5 to the time point t6, the distance between the positions indicated by the input pointer 31 and the output pointer 32 regarding the SP data buffer 24 returns to a value corresponding to 10 samples from a value corresponding to 6 samples (see FIG. 3(d)).

Under the normal conditions, 5 digital signal samples (pieces) are outputted from the MIC data buffer 26 at every sample timing before being processed by the vocoder encoder 27 and the symbol generator 28 into 5 digital modulating signal samples (pieces) which are written into the MOD data buffer 29. To avoid the coincidence of the positions indicated by the input pointer 31 and the output pointer 32 regarding each of the MIC data buffer 26 and the MOD data buffer 29, the aforesaid series of actions taken under the normal conditions is implemented twice only at, for example, the time point t6 in FIG. 3(a). Thereby, 10 digital signal samples are outputted from the MIC data buffer 26 and 10 digital signal samples are inputted into the MOD data buffer 29 at the symbol timing related to the time point t6. Although 10 digital signal samples corresponding to two symbols are inputted into the MOD data buffer 29 at the symbol timing related to the time point t6, the number of digital signal samples outputted from the MOD data buffer 29 for a unit time remains unchanged so that the symbol transmission rate remains unchanged also.

Figure 4A:
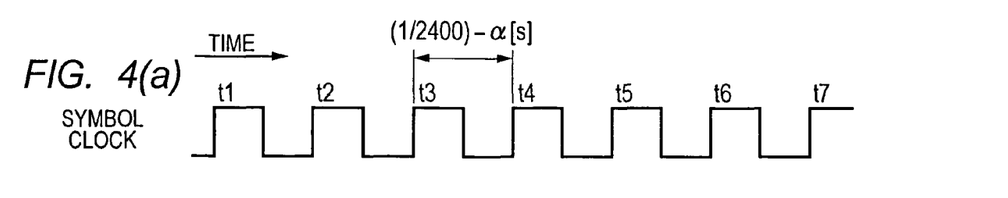
FIGS. 4(a) to 4(e) are a time-domain diagram showing the waveform of the symbol clock signal and the states of the data buffers which occur in conditions where the symbol reception rate is higher than the prescribed rate.
Figure 4B:
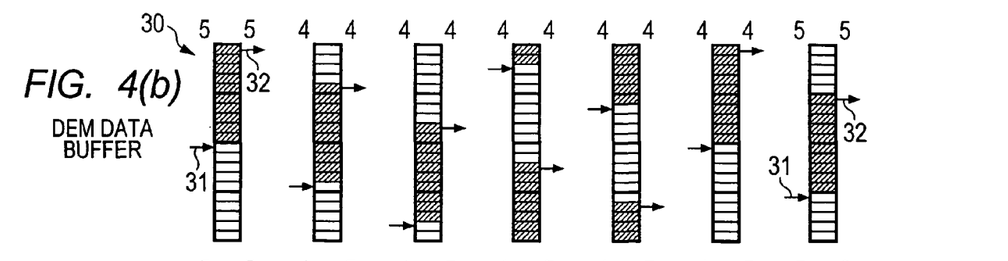

With reference to FIGS. 4(a) to 4(e), there are shown movements of digital signal samples in the data buffers 21, 24, 26, and 29 which occur at every symbol timing defined by the symbol clock signal corresponding to the symbol reception rate higher than 2400 sps (the prescribed symbol rate). As previously mentioned, when the symbol reception rate changes so that the symbol timing deviates from the Nyquist point, the clock reproducer 25 operates to shift the symbol timing in the direction of reducing the difference of the symbol timing from the Nyquist point. Thus, as the symbol reception rate increases, the interval between adjacent symbol timings decreases and hence the number of digital signal samples inputted into the DEM data buffer 21 per symbol timing decreases also. It should be noted that the number of samples generated by the A/D converter 12 for a unit time remains constant. In FIG. 4(b), the number of digital signal samples inputted into the DEM data buffer 21 per symbol timing decreases from 5 to 4. As previously mentioned, at every symbol timing, the symbol detector 22 fetches or reads out digital signal samples corresponding to one symbol from the DEM data buffer 21. Thus, in FIG. 4(b), the symbol detector 22 reads out 4 digital signal samples from the DEM buffer 21 per symbol timing and decides a symbol value on the basis of the 4 digital signal samples. Similarly, the number of digital signal samples inputted into the MIC data buffer 26 and the number of digital signal samples outputted from each of the SP data buffer 24 and the MOD data buffer 29 per symbol timing decrease from 5 to 4. It should be noted that the number of samples generated or processed by each of the A/D converter 14 and the D/A converters 15 and 17 for a unit time remains constant.

Figure 4C:
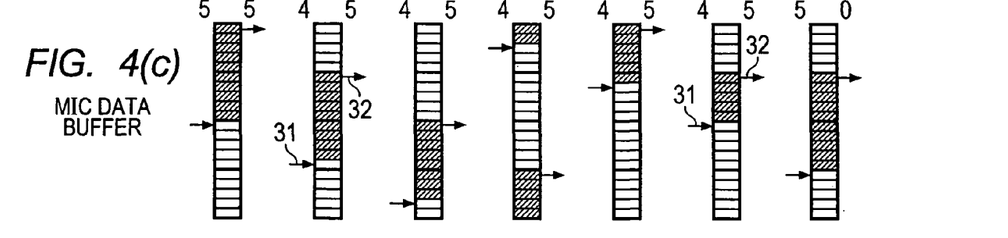
Figure 4D:
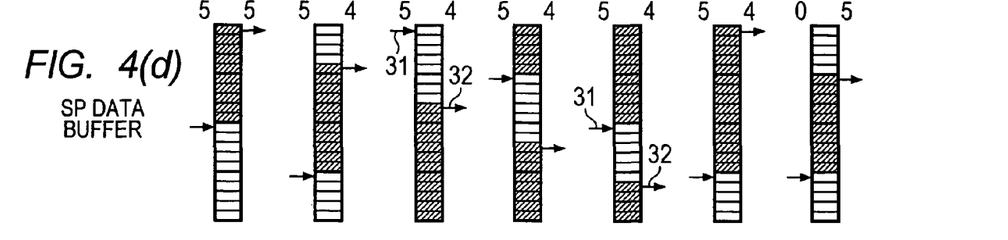
Figure 4E:
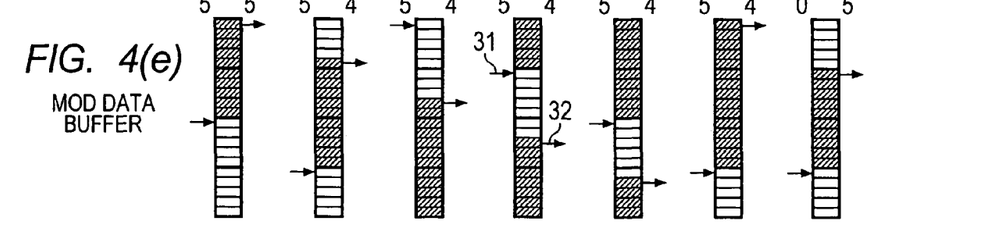

As previously mentioned, the number of digital signal samples outputted from the MIC data buffer 26 and the number of digital signal samples inputted into each of the SP data buffer 24 and the MOD data buffer 29 per symbol timing substantially remain constant (5 in FIGS. 4(c), 4(d), and 4(e)). Thus, the relation between the positions indicated by the input pointer 31 and the output pointer 32 regarding each of the data buffers 24, 26, and 29 varies in accordance with the lapse of time. As shown in FIG. 4(c), regarding the MIC data buffer 26, the number of digital signal samples inputted per symbol timing is smaller than the number of digital signal samples outputted per symbol timing so that the number of digital signal samples in the buffer decreases and the positions indicated by the input pointer 31 and the output pointer 32 approach each other while a storage area occupied by digital signal samples is sandwiched therebetween. As shown in FIGS. 4(d) and 4(e), regarding each of the SP data buffer 24 and the MOD data buffer 29, the number of digital signal samples inputted per symbol timing is greater than the number of digital signal samples outputted per symbol timing so that the number of digital signal samples in the buffer increases and the positions indicated by the input pointer 31 and the output pointer 32 approach each other while a storage area unoccupied by digital signal samples is sandwiched therebetween. The DSP 20 implements the following method of avoiding the coincidence of the positions indicated by the input pointer 31 and the output pointer 32 regarding each of the SP data buffer 24, the MIC data buffer 26, and the MOD data buffer 29.

To avoid the above-mentioned coincidence regarding the SP data buffer 24, the vocoder decoder 23 temporarily halts sample generation only at, for example, the time point t7 in FIG. 4(a). Thus, the number of digital-audio-signal samples generated by the vocoder decoder 23 is decreased to 0 at that time point. It should be noted that the vocoder decoder 23 generates 5 digital-audio-signal samples at every symbol timing under the normal conditions. Preferably, the vocoder decoder 23 uses one having the function of increasing and decreasing the number of decoding-result samples generated per unit time. By using this function, the number of digital-audio-signal samples generated at the time point t7 is decreased from 5 to 0. The vocoder decoder 23 may not have this function. In this case, the number of digital-audio-signal samples generated at the time point t7 is decreased by a suitable device such as a multi-rate filter or a decimator.

Under the normal conditions, 5 digital signal samples are outputted from the MIC data buffer 26 at every sample timing before being processed by the vocoder encoder 27 and the symbol generator 28 into 5 digital modulating signal samples which are written into the MOD data buffer 29. To avoid the coincidence of the positions indicated by the input pointer 31 and the output pointer 32 regarding each of the MIC data buffer 26 and the MOD data buffer 29, the aforesaid series of actions taken under the normal conditions is not implemented only at, for example, the time point t7 in FIG. 4(a). Thereby, no digital signal sample is outputted from the MIC data buffer 26 and no digital signal sample is inputted into the MOD data buffer 29 at the symbol timing related to the time point t7. Although no digital signal sample is inputted into the MOD data buffer 29 at the symbol timing related to the time point t7, the number of digital signal samples outputted from the MOD data buffer 29 for a unit time remains unchanged so that the symbol transmission rate remains unchanged also.

Figure 5:
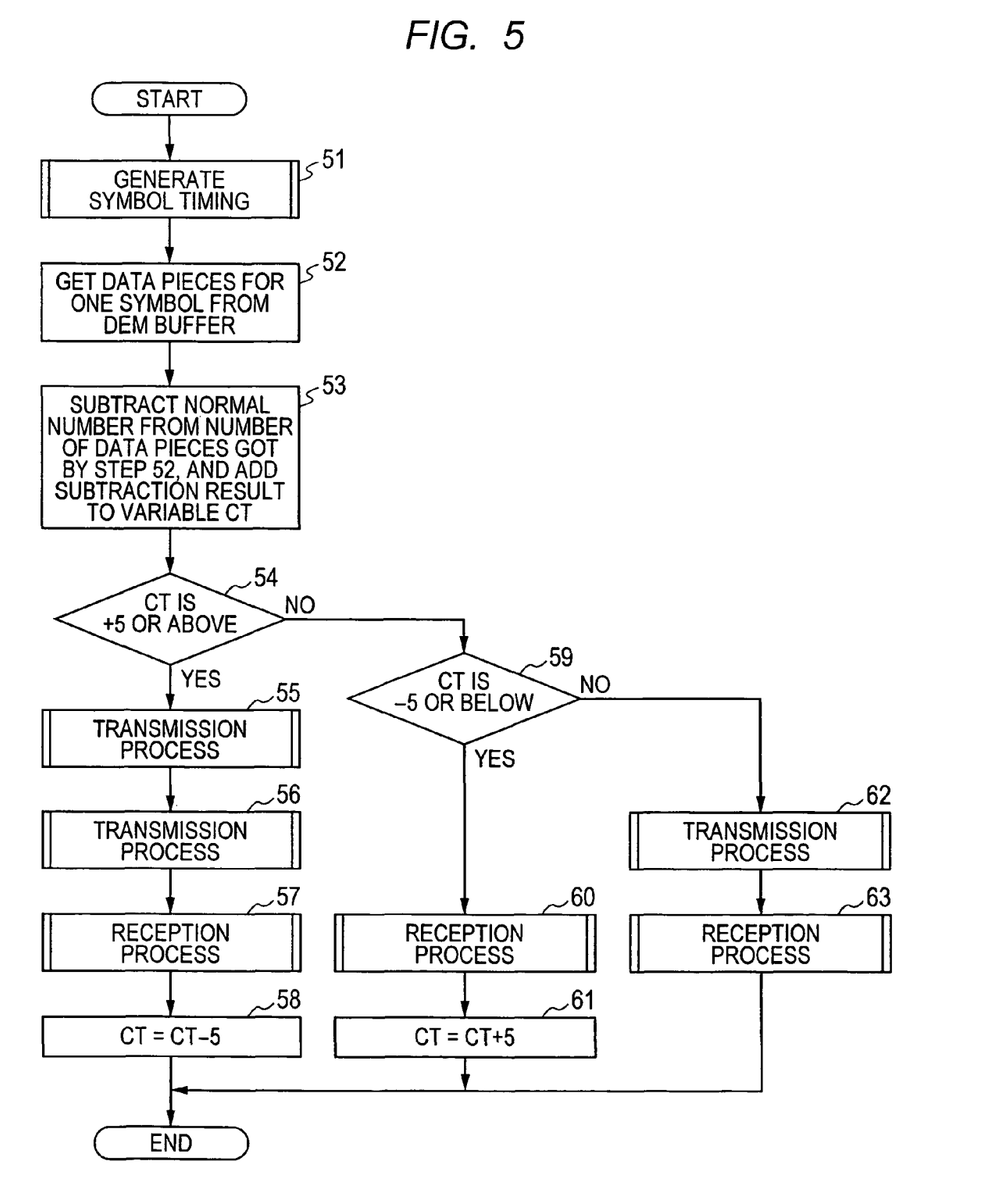
FIG. 5 is a flowchart of a segment of a control program for a DSP in the apparatus of FIG. 1 which is designed to avoid the coincidence of the positions indicated by an input pointer and an output pointer.

FIG. 5 is a flowchart of a segment (subroutine) of the control program in the DSP 20 which is designed to avoid the coincidence of the positions indicated by the input pointer 31 and the output pointer 32 regarding each of the data buffers 24, 26, and 29. The main routine is suspended and the program segment (subroutine) in FIG. 5 is started each time an interrupt occurs in response to the symbol clock signal fed from the timer logic 19.

As shown in FIG. 5, the program segment has a first step 51 which enables the clock reproducer 25 to generate or reproduce a symbol timing referred to as a current symbol timing.

A step 52 following the step 51 fetches or reads out, from the DEM data buffer 21, digital signal samples whose number is equal to the number of digital signal samples inputted into or outputted from the DEM data buffer 21 during the 1-symbol period from the immediately-preceding symbol timing to the current symbol timing.

A step 53 subsequent to the step 52 counts the digital signal samples read out by the step 52 to detect the number thereof. The step 53 subtracts 5 (the normal sample number) from the detected number of the digital signal samples. The step 53 updates a counter (a variable indicative of a counter) CT by adding the subtraction result thereto. In the case where 6 digital signal samples are read out by the step 52 as shown in FIG. 3(b), the step 53 adds "+1" to the counter CT. In the case where 4 digital signal samples are read out by the step 52 as shown in FIG. 4(b), the step 53 adds "−1" to the counter CT.

A step 54 following the step 53 decides whether or not the current value of the counter CT is less than +5 (a positive threshold value). When the current value of the counter CT is equal to or greater than +5, the program advances from the step 54 to a block 55. On the other hand, when the current value of the counter CT is less than +5, the program advances from the step 54 to a step 59.

The block 55 implements a transmission process including an action of reading out, from the MIC data buffer 26, 5 digital signal samples corresponding to one symbol, an action of processing the 5 digital signal samples into 5 digital modulating signal samples through the vocoder encoder 27 and the symbol generator 28, and an action of outputting the 5 digital modulating signal samples to the MOD data buffer 29.

A block 56 subsequent to the block 55 implements the aforesaid transmission process again.

Thus, when the current value of the counter CT is equal to or greater than +5, the transmission process is implemented twice. With reference to FIGS. 3(*a*) to 3(*e*), the transmission process is implemented twice at the time point t6 for the following reason. The step 53 adds "+1" to the counter CT at each of the time points t2-t6 so that the value of the counter CT reaches +5 at the time point t6. As shown in FIGS. 3(*c*) and 3(*e*), the distance between the positions indicated by the input pointer 31 and the output pointer 32 regarding each of the MIC data buffer 26 and the MOD data buffer 29 decreases to a value corresponding to 6 samples at the time point t5, and the twice implementation of the transmission process at the time point t6 corrects the distance in question to a value corresponding to 10 samples.

A block 57 following the block 56 implements a reception process including an action of reading out, from the DEM data buffer 21, 6 digital signal samples corresponding to one symbol, an action of processing the 6 digital signal samples into 10 digital signal samples through the symbol detector 22 and the vocoder decoder 23, and an action of outputting the 10 digital signal samples to the SP data buffer 24.

With reference to FIGS. 3(*a*) to 3(*e*), the reception process is implemented once at the time point t6. As shown in FIG. 3(*d*), during the time range from the time point t5 to the time point t6, the implementation of the reception process corrects the distance between the positions indicated by the input pointer 31 and the output pointer 32 regarding the SP data buffer 24 to a value corresponding to 10 samples from a value corresponding to 6 samples.

A step 58 subsequent to the block 57 updates the counter CT by adding "−5" thereto in accordance with the correction of the distance in question regarding each of the data buffers 24, 26, and 29 to the value corresponding to 10 samples. After the step 58, the current execution of the program segment ends and the program returns to the main routine.

The step 59 decides whether or not the current value of the counter CT is greater than −5 (a negative threshold value). When the current value of the counter CT is equal to or less than −5, the program advances from the step 59 to a block 60. On the other hand, when the current value of the counter CT is greater than −5, the program advances from the step 59 to a block 62.

The block 60 implements a reception process including an action of reading out, from the DEM data buffer 21, 4 digital signal samples corresponding to one symbol, an action of processing the 4 digital signal samples through the symbol detector 22, and an action of controlling the vocoder decoder 23 to output no digital signal sample to the SP data buffer 24.

Thus, when the current value of the counter CT is equal to or less than −5, the block 60 implements the reception process which outputs no digital signal sample to the SP data buffer 24. With reference to FIGS. 4(*a*) to 4(*e*), the reception process is implemented at the time point t6 for the following reason. The step 53 adds "−1" to the counter CT at each of the time points t2-t6 so that the value of the counter CT reaches −5 at the time point t6. The distance between the positions indicated by the input pointer 31 and the output pointer 32 regarding the SP data buffer 24 decreases to a value corresponding to 6 samples at the time point t5, and the implementation of the reception process at the time point t6 corrects the distance in question to a value corresponding to 10 samples. The reception process may be implemented at the next time point t7. FIGS. 4(*a*) to 4(*e*) show a case where the reception process is implemented at the time point t7.

As will be made clear later, when the current value of the counter CT is equal to or less than −5, a transmission process is not implemented. The non-implementation of the transmission process causes no digital signal sample to be outputted from the MIC data buffer 26 and no digital signal sample to be inputted into the MOD data buffer 29. The distance between the positions indicated by the input pointer 31 and the output pointer 32 regarding each of the MIC data buffer 26 and the MOD data buffer 29 decreases to a value corresponding to 6 samples at the time point t5, and the non-implementation of the transmission process at the time point t6 corrects the distance in question to a value corresponding to 10 samples. The non-implementation of the transmission process may be at the next time point t7. FIGS. 4(*a*) to 4(*e*) show a case where the non-implementation of the transmission process is at the time point t7.

A step 61 subsequent to the block 60 updates the counter CT by adding "+5" thereto in accordance with the correction of the distance in question regarding each of the data buffers 24, 26, and 29 to the value corresponding to 10 samples. After the step 61, the current execution of the program segment ends and the program returns to the main routine.

The block 62 implements the transmission process. A block 63 following the block 62 implements a reception process including an action of reading out, from the DEM data buffer 21, 5 digital signal samples corresponding to one symbol, an action of processing the 5 digital signal samples into 5 processing-result digital signal samples through the symbol detector 22 and the vocoder decoder 23, and an action of outputting the 5 processing-result digital signal samples to the SP data buffer 24. After the block 63, the current execution of the program segment ends and the program returns to the main routine.

Figure 6:
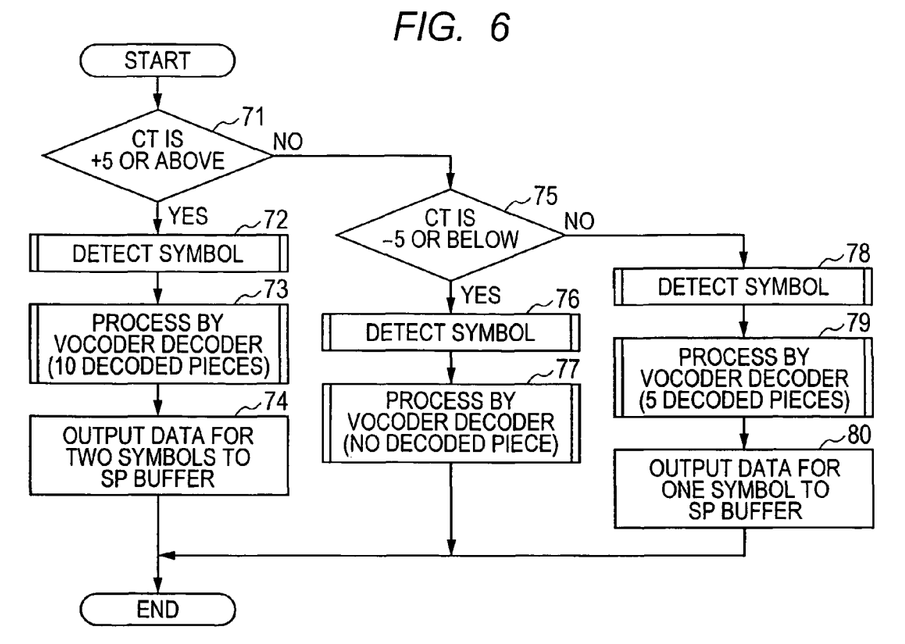
FIG. 6 is a flowchart of each block for a reception process in FIG. 5.

The blocks 57, 60, and 63 for the reception processes may be of a same structure shown in FIG. 6. As shown in FIG. 6, the block has a first step 71 which decides whether or not the current value of the counter CT is less than +5. When the current value of the counter CT is equal to or greater than +5, the program advances from the step 71 to a step 72. On the other hand, when the current value of the counter CT is less than +5, the program advances from the step 71 to a step 75.

The step 72 detects a symbol value through the symbol detector 22. Specifically, the step 72 fetches or reads out, from the DEM data buffer 21, digital signal samples corresponding to one symbol. The step 72 derives the symbol value from the digital signal samples at the symbol timing generated by the step 51.

A step 73 following the step 72 enables the vocoder decoder 23 to generate 10 digital-audio-signal samples corresponding to two symbols on the basis of the symbol value detected by the step 72.

A step 74 subsequent to the step 73 outputs and writes the 10 digital-audio-signal samples to and in the SP data buffer 24. After the step 74, the program exits from the block.

The step 75 decides whether or not the current value of the counter CT is greater than −5. When the current value of the counter CT is equal to or less than −5, the program advances from the step 75 to a step 76. On the other hand, when the current value of the counter CT is greater than −5, the program advances from the step 75 to a step 78.

The step 76 detects a symbol value through the symbol detector 22 as the step 72 does.

A step 77 following the step 76 disables and controls the vocoder decoder 23 not to generate digital-audio-signal samples. Thus, the vocoder decoder 23 outputs and writes no digital-audio-signal sample to and in the SP data buffer 24. After the step 77, the program exits from the block.

The step 78 detects a symbol value through the symbol detector 22 as the step 72 does.

A step 79 following the step 78 enables the vocoder decoder 23 to generate 5 digital-audio-signal samples corresponding to one symbol on the basis of the symbol value detected by the step 78.

A step 80 subsequent to the step 73 outputs and writes the 5 digital-audio-signal samples to and in the SP data buffer 24. After the step 80, the program exits from the block.

Figure 7:
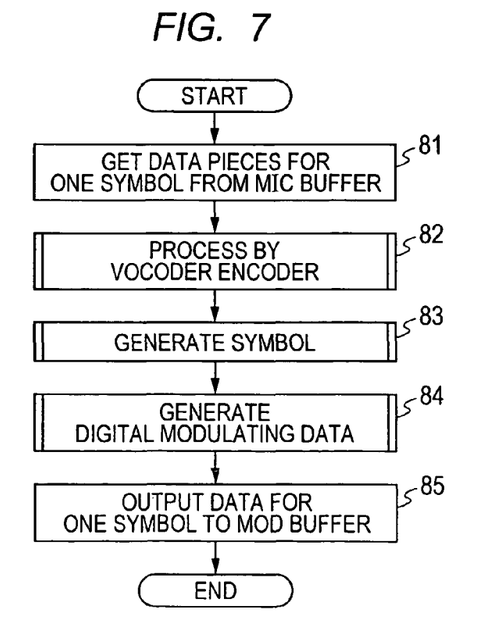
FIG. 7 is a flowchart of each block for a transmission process in FIG. 5.

The blocks 55, 56, and 62 for the transmission process may be of a same structure shown in FIG. 7. As shown in FIG. 7, the block has a first step 81 which fetches or reads out, from the MIC data buffer 26, 5 digital signal samples corresponding to one symbol.

A step 82 following the step 81 encodes the 5 fetched digital signal samples into encoding-result data through the vocoder encoder 27.

A step 83 subsequent to the step 82 generates a symbol on the basis of the encoding-result data through the symbol generator 28.

A step 84 following the step 83 generates 5 digital modulating signal samples (pieces) from the generated symbol through the symbol generator 28.

A step 85 subsequent to the step 84 outputs and writes the 5 digital modulating signal samples to and in the MOD data buffer 29. After the step 85, the program exits from the block.

The counter CT is an indication of the number of digital signal samples in each of the data buffers 24, 26, and 29. Regarding each of the data buffers 24, 26, and 29, the decisions by the steps 54 and 71 in FIGS. 5 and 6 determine whether or not the number of digital signal samples in the data buffer reaches one of upper and lower limits of a predetermined range. The decisions by the steps 59 and 75 in FIGS. 5 and 6 determine whether or not the number of digital signal samples in the data buffer reaches the other of the upper and lower limits of the predetermined range. The threshold values +5 and −5 used by the steps 54, 59, 71, and 75 correspond to the two limits of the predetermined range. Regarding each of the data buffers 24, 26, and 29, the actions by the blocks 55, 56, 57 and 60 in FIG. 5 enable the number of digital signal samples in the data buffer to be held in the predetermined range.

In the case where the radio communication apparatus simultaneously performs the receiving operation and the transmitting operation, the symbol timing generated and used by the DSP 20 is adjusted to follow a change in the symbol reception rate while the symbol transmission rate is held at the prescribed constant value. Therefore, it is possible to attain high receiving performances of the radio communication apparatus while providing a high-quality transmitted signal having a constant symbol transmission rate which is required for application to a radio-communication base station. Other apparatuses which catch the high-quality transmitted signal in the form of a radio wave are enabled to receive data with a symbol rate having only a small error. Thus, the other apparatuses can implement decoding with only a small error and accurately recover the contents of the caught signal.

While the symbol timing generated and used by the DSP 20 is adjusted to follow a change in the symbol reception rate, every received symbol is detected at the symbol timing and every symbol to be transmitted is generated at the symbol timing. Thus, the receiving operation and the transmitting operation of the radio communication apparatus use the symbol timing in common. Therefore, only one timer logic (the timer logic 19) outside the DSP 20 suffices for the radio communication apparatus. As compared to a case where two timer logics outside a DSP are used, the radio communication apparatus is excellent in cost and consumed electric power. The use of only one interrupt port of the DSP 20 suffices, and another interrupt port thereof can be utilized for another purpose.

In the case where the distance between the positions indicated by the input pointer 31 and the output pointer 32 regarding the SP data buffer 24 decreases to an unacceptable range due to a change in the symbol reception rate, the number of digital signal samples (pieces) inputted into the SP data buffer 24 is reduced to zero or doubled at a suitable symbol timing to correct the distance in question. Therefore, it is possible to prevent continuity of received data from being lost due to a change in the symbol reception rate.

In the case where the distance between the positions indicated by the input pointer 31 and the output pointer 32 regarding the MOD data buffer 29 decreases to an unacceptable range due to a change in the symbol reception rate, the number of digital modulating signal samples (pieces) generated and inputted into the MOD data buffer 29 is reduced to zero or doubled at a suitable symbol timing to correct the distance in question. In the case where the distance between the positions indicated by the input pointer 31 and the output pointer 32 regarding the MIC data buffer 26 decreases to an unacceptable range due to a change in the symbol reception rate, the number of digital signal samples (pieces) outputted from the MIC data buffer 26 is reduced to zero or doubled at a suitable symbol timing to correct the distance in question. Therefore, it is possible to prevent continuity of transmitted data from being lost due to a change in the symbol reception rate.

The DSP 20 decides whether or not the distance between the positions indicated by the input pointer 31 and the output pointer 32 regarding each of the data buffers 24, 26, and 29 is changed by referring to the number of digital signal samples inputted into the DEM data buffer 21 and the number of digital signal samples outputted therefrom at every symbol timing. Alternatively, regarding each of the data buffers 24, 26, and 29, the DSP 20 may check the addresses (positions) indicated by the input pointer 31 and the output pointer 32 and calculate the distance between the checked addresses.

To avoid the coincidence of the positions indicated by the input pointer 31 and the output pointer 32 regarding the SP data buffer 24, the number of digital signal samples generated by the vocoder decoder 23 and inputted into the SP data buffer 24 is reduced to zero or doubled at a suitable symbol timing. For this action, the number of digital signal samples may be reduced to a non-zero value or increased by a given value. To avoid the coincidence of the positions indicated by the input pointer 31 and the output pointer 32 regarding each of the MIC data buffer 26 and the MOD data buffer 29, the number of times the transmission process is implemented by the DSP 20 is changed to zero or twice at a suitable symbol timing. For this action, the number of times may be changed to thrice or more.

Each of the data buffers 21, 24, 26, and 29 may have storage locations, the number of which differs from 20. The counter CT is used as an indication of the distance between the positions indicated by the input pointer 31 and the output pointer 32 regarding each of the data buffers 24, 26, and 29. The positive threshold value and the negative threshold value for the counter CT at which correcting the distance in question is performed may differ from +5 and −5, respectively. In the case where each of the data buffers 24, 26, and 29 has a small size, it is preferable to finely and frequently correct the distance in question. On the other hand, in the case where each of the data buffers 24, 26, and 29 has a large size, a signal delay caused by the buffer is preferably in a range where the radio communication apparatus meets the required specifications.

What is claimed is:

1. A radio communication apparatus comprising:
a clock reproducer unit configured to repetitively detect a symbol timing from a Nyquist point in detection-result data;
a first FIFO buffer;
a symbol generator unit configured to controllably generate or non-generate a to-be-transmitted symbol or symbols at every symbol timing detected by the clock reproducer unit, convert the to-be-transmitted symbol or symbols into modulating data pieces, and output the modulating data pieces to the first FIFO buffer;
a first D/A converter configured to read out modulating data pieces from the first FIFO buffer at a predetermined rate and convert the read-out modulating data pieces into an analog modulating signal for use in modulation of a carrier; and
a controller unit configured to control a number of the to-be-transmitted symbol or symbols generated by the symbol generator unit at every symbol timing to hold a number of modulating data pieces in the first FIFO buffer in a predetermined range.

2. A radio communication apparatus as recited in claim 1, further comprising:
a second FIFO buffer;
a first A/D converter configured to repetitively sample an analog to-be-transmitted signal at a predetermined sampling rate to generate analog signal samples, convert the generated analog signal samples into to-be-transmitted data pieces, and output the to-be-transmitted data pieces to the second FIFO buffer; and
an encoder unit configured to read out, from the second FIFO buffer, to-be-transmitted data pieces whose number corresponds to the number of the to-be-transmitted symbol or symbols generated by the symbol generator at every symbol timing, and encode the read-out to-be-transmitted data pieces into encoding-result data;
wherein the symbol generator unit operates to generate the to-be-transmitted symbol or symbols on the basis of the encoding-result data generated by the encoder unit, and the control of the number of the to-be-transmitted symbol or symbols by the controller unit causes a number of to-be-transmitted data pieces in the second FIFO buffer to be held in a predetermined range.

3. A radio communication apparatus as recited in claim 2, further comprising:
a third FIFO buffer;
a second A/D converter configured to repetitively sample an analog detection-result signal at a predetermined sampling rate to generate analog signal samples, convert the generated analog signal samples into detection-result data pieces, and output the detection-result data pieces to the third FIFO buffer;
a symbol detector unit configured to read out detection-result data pieces from the third FIFO buffer and detect a received symbol from the read-out detection-result data pieces;
a fourth FIFO buffer;
a decoder unit configured to decode the received symbol detected by the symbol detector unit into decoding-result data pieces and output the decoding-result data pieces to the fourth FIFO buffer; and
a second D/A converter configured to read out the decoding-result data pieces from the fourth FIFO buffer at a predetermined rate and convert the read-out decoding-result data pieces into a corresponding analog signal;
wherein the controller unit operates to control a number of decoding-result data pieces generated by the decoder unit and outputted to the fourth FIFO buffer for one symbol to hold a number of decoding-result data pieces in the fourth FIFO buffer in a predetermined range.

4. A radio communication apparatus as recited in claim 3, wherein the controller unit operates to control the encoder unit to perform encoding for two symbols at one symbol timing to hold the number of to-be-transmitted data pieces in the second FIFO buffer in the predetermined range in cases where the number of to-be-transmitted data pieces in the second FIFO buffer reaches an upper limit of the predetermined range due to a retard of the symbol timing from a prescribed timing, and the controller unit operates to control the symbol generator unit to generate modulating data pieces for plural symbols at one symbol timing to hold the number of modulating data pieces in the first FIFO buffer in the predetermined range in cases where the number of modulating data pieces in the first FIFO buffer reaches a lower limit of the predetermined range due to the retard of the symbol timing from the prescribed timing.

5. A radio communication apparatus as recited in claim 3, wherein the controller unit operates to control the encoder unit to suspend encoding at one symbol timing or more to hold the number of to-be-transmitted data pieces in the second FIFO buffer in the predetermined range in cases where the number of to-be-transmitted data pieces in the second FIFO buffer reaches a lower limit of the predetermined range due to an advance of the symbol timing from a prescribed timing, and the controller unit operates to control the symbol generator unit to suspend generating modulating data pieces at one symbol timing or more to hold the number of modulating data pieces in the first FIFO buffer in the predetermined range in cases where the number of modulating data pieces in the first FIFO buffer reaches an upper limit of the predetermined range due to the advance of the symbol timing from the prescribed timing.

6. A method for radio communication, comprising the steps of:
detecting a symbol timing from a Nyquist point in detection-result data;
controllably generating or non-generating a to-be-transmitted symbol or symbols at every detected symbol timing, converting the to-be-transmitted symbol or symbols into modulating data pieces, and outputting the modulating data pieces to a first FIFO buffer;
reading out modulating data pieces from the first FIFO buffer at a predetermined rate and converting the read-out modulating data pieces into an analog modulating signal for use in modulation of a carrier; and
controlling a number of the to-be-transmitted symbol or symbols generated at every detected symbol timing to hold a number of modulating data pieces in the first FIFO buffer in a predetermined range.

7. A method as recited in claim 6, further comprising the steps of:
repetitively sampling an analog to-be-transmitted signal at a predetermined sampling rate to generate analog signal samples, converting the generated analog signal samples into to-be-transmitted data pieces, and outputting the to-be-transmitted data pieces to a second FIFO buffer; and reading out, from the second FIFO buffer, to-be-transmitted data pieces whose number corresponds to the number of the to-be-transmitted symbol or symbols generated at every symbol timing, and encoding the read-out to-be-transmitted data pieces into encoding-result data;

wherein the to-be-transmitted symbol or symbols are generated on the basis of the encoding-result data, and the control of the number of the to-be-transmitted symbol or symbols causes a number of to-be-transmitted data pieces in the second FIFO buffer to be held in a predetermined range.

8. A method as recited in claim 7, further comprising the steps of:

repetitively sampling an analog detection-result signal at a predetermined sampling rate to generate analog signal samples, converting the generated analog signal samples into detection-result data pieces, and outputting the detection-result data pieces to a third FIFO buffer;

reading out detection-result data pieces from the third FIFO buffer and detecting a received symbol from the read-out detection-result data pieces;

decoding the detected symbol into decoding-result data pieces and outputting the decoding-result data pieces to a fourth FIFO buffer; and reading out decoding-result data pieces from the fourth FIFO buffer at a predetermined rate and converting the read-out decoding-result data pieces into a corresponding analog signal;

wherein a number of decoding-result data pieces generated and outputted to the fourth FIFO buffer for one symbol is controlled to hold a number of decoding-result data pieces in the fourth FIFO buffer in a predetermined range.

9. A method as recited in claim 8, wherein encoding for two symbols is performed at one symbol timing to hold the number of to-be-transmitted data pieces in the second FIFO buffer in the predetermined range in cases where the number of to-be-transmitted data pieces in the second FIFO buffer reaches an upper limit of the predetermined range due to a retard of the symbol timing from a prescribed timing, and modulating data pieces for plural symbols are generated at one symbol timing to hold the number of modulating data pieces in the first FIFO buffer in the predetermined range in cases where the number of modulating data pieces in the first FIFO buffer reaches a lower limit of the predetermined range due to the retard of the symbol timing from the prescribed timing.

10. A method as recited in claim 8, wherein encoding is suspended at one symbol timing or more to hold the number of to-be-transmitted data pieces in the second FIFO buffer in the predetermined range in cases where the number of to-be-transmitted data pieces in the second FIFO buffer reaches a lower limit of the predetermined range due to an advance of the symbol timing from a prescribed timing, and generating modulating data pieces is suspended at one symbol timing or more to hold the number of modulating data pieces in the first FIFO buffer in the predetermined range in cases where the number of modulating data pieces in the first FIFO buffer reaches an upper limit of the predetermined range due to the advance of the symbol timing from the prescribed timing.

11. A radio communication apparatus comprising:
means for repetitively detecting a symbol timing from a Nyquist point in detection-result data;

a first FIFO buffer;

means for controllably generating or non-generating a to-be-transmitted symbol or symbols at every detected symbol timing, converting the to-be-transmitted symbol or symbols into modulating data pieces, and writing the modulating data pieces into the first FIFO buffer;

means for reading out modulating data pieces from the first FIFO buffer at a predetermined rate and converting the read-out modulating data pieces into an analog modulating signal for use in modulation of a carrier; and means for controlling a number of the to-be-transmitted symbol or symbols generated at every symbol timing to hold a number of modulating data pieces in the first FIFO buffer in a predetermined range.

12. A radio communication apparatus as recited in claim 11, further comprising:

a second FIFO buffer;

means for repetitively sampling an analog to-be-transmitted signal at a predetermined sampling rate to generate analog signal samples, converting the generated analog signal samples into to-be-transmitted data pieces, and writing the to-be-transmitted data pieces into the second FIFO buffer; and means for reading out, from the second FIFO buffer, to-be-transmitted data pieces whose number corresponds to the number of the to-be-transmitted symbol or symbols generated at every symbol timing, and encoding the read-out to-be-transmitted data pieces into encoding-result data;

wherein the generating means comprises means for generating the to-be-transmitted symbol or symbols on the basis of the encoding-result data, and the control of the number of the to-be-transmitted symbol or symbols by the controlling means causes a number of to-be-transmitted data pieces in the second FIFO buffer to be held in a predetermined range.

13. A radio communication apparatus as recited in claim 12, further comprising:

a third FIFO buffer;

means for repetitively sampling an analog detection-result signal at a predetermined sampling rate to generate analog signal samples, converting the generated analog signal samples into detection-result data pieces, and writing the detection-result data pieces to the third FIFO buffer;

means for reading out detection-result data pieces from the third FIFO buffer and detecting a received symbol from the read-out detection-result data pieces;

a fourth FIFO buffer;

means for decoding the detected symbol into decoding-result data pieces and outputting the decoding-result data pieces to the fourth FIFO buffer; and means for reading out decoding-result data pieces from the fourth FIFO buffer at a predetermined rate and converting the read-out decoding-result data pieces into a corresponding analog signal;

wherein the controlling means comprises means for controlling a number of decoding-result data pieces generated and written into the fourth FIFO buffer for one symbol to hold a number of decoding-result data pieces in the fourth FIFO buffer in a predetermined range.

14. A radio communication apparatus as recited in claim 13, wherein the controlling means comprises means for controlling the encoding means to perform encoding for two symbols at one symbol timing to hold the number of to-be-transmitted data pieces in the second FIFO buffer in the predetermined range in cases where the number of to-betransmitted data pieces in the second FIFO buffer reaches an upper limit of the predetermined range due to a retard of the symbol timing from a prescribed timing, and the controlling means comprises means for controlling the generating means to generate modulating data pieces for plural symbols at one symbol timing to hold the number of modulating data pieces in the first FIFO buffer in the predetermined range in cases where the number of modulating data pieces in the first FIFO buffer reaches a lower limit of the predetermined range due to the retard of the symbol timing from the prescribed timing.

15. A radio communication apparatus as recited in claim 13, wherein the controlling means comprises means for controlling the encoder means to suspend encoding at one symbol timing or more to hold the number of to-be-transmitted data pieces in the second FIFO buffer in the predetermined range in cases where the number of to-be-transmitted data pieces in the second FIFO buffer reaches a lower limit of the predetermined range due to an advance of the symbol timing from a prescribed timing, and the controlling means comprises means for controlling the generating means to suspend generating modulating data pieces at one symbol timing or more to hold the number of modulating data pieces in the first FIFO buffer in the predetermined range in cases where the number of modulating data pieces in the first FIFO buffer reaches an upper limit of the predetermined range due to the advance of the symbol timing from the prescribed timing.

* * * * *